Figure 1:
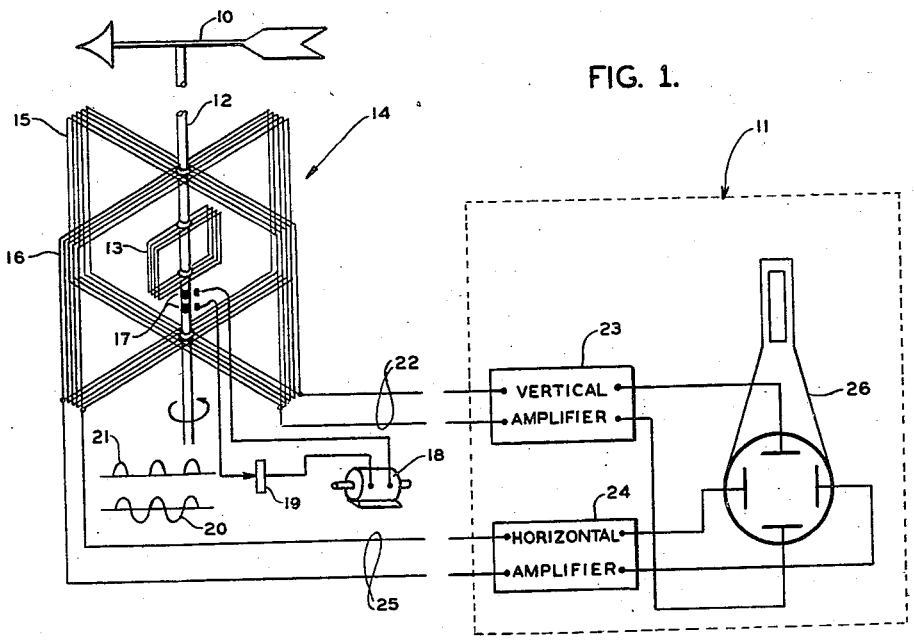

May 8, 1945. L. HILLMAN 2,375,227
WIND DIRECTION AND VELOCITY TELEMETERING DEVICE
Filed Aug. 7, 1944

INVENTOR.
LEON HILLMAN
BY
ATTORNEY

Patented May 8, 1945

2,375,227

UNITED STATES PATENT OFFICE 2,375,227

WIND DIRECTION AND VELOCITY TELEMETERING DEVICE

Leon Hillman, New York, N. Y.

Application August 7, 1944, Serial No. 548,479

4 Claims. (Cl. 73—189)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to telemetering devices for transmitting vectorial data, and is more particularly directed to the continuous transmission of wind direction and speed indications as obtained from standard meteorological instruments.

The motion of wind is a vector quantity having both magnitude and direction. For meteorological purposes, wind direction is commonly measured by wind vanes, while wind speed is determined by the use of anemometers. Since accuracy of measurement necessitates that these instruments be installed at exposed and elevated positions, free from obstructions, telemetric means are desirable for transmitting wind readings to points remote from said instruments.

Accordingly, it is one of the principal objects of the present invention to provide new and improved telemetric means for concurrently transmitting wind speed and direction indications.

It is another object of this invention to provide a telemetric system which continuously transmits instantaneous values of wind speed and direction.

Yet another object of this invention is to provide telemetric means of the above type which is operable in conjunction with standard meteorological instruments.

An additional object of this invention is to provide an indicator in association with the above telemetric means which affords a single direct reading of wind velocity without reference to charts.

Another object of this invention is to provide telemetric means of the above type which require the use of relatively few transmission wires and s of simple design and construction.

Broadly stated, the telemetric system comprises a goniometer, having a pair of crossed stator loops and a rotor loop, in association with a visual indicator in the form of a cathode ray scillograph. The rotor loop of the goniometer is mechanically coupled to and rotates with an exposed wind vane. Applied to the rotor loop are unipolarity voltage pulses of fixed magnitude. The energy induced in each of the stator loops has a magnitude and polarity which is a function of the rotor orientation in respect thereto. The respective outputs of the stators are fed to opposing deflection plates of the cathode ray oscillograph in a manner whereby the radial line pattern traced on the screen thereof corresponds in position to the orientation of the wind vane.

In the telemetric system above described, the unipolarity voltage pulses supplied to the rotor loop are secured from an alternating current generator whose output is half-wave rectified. In another preferred embodiment of the present invention, the generator is operated by a rotation anemometer exposed to the wind. Consequently, the energy magnitude and frequency yielded by the generator is a function of wind speed. This effect is displayed on the screen of the oscillograph in terms of the length of the line pattern traced thereon. Thus the angular disposition of the screen line provides the wind direction and the extent of the line, the index to wind speed.

For a better understanding of the invention, together with other and further objects thereof, reference is had to the following description taken in connection with the accompanying drawing, wherein like parts are indicated by like reference numerals, and its scope will be pointed out in the accompanying claims.

Figure 2:
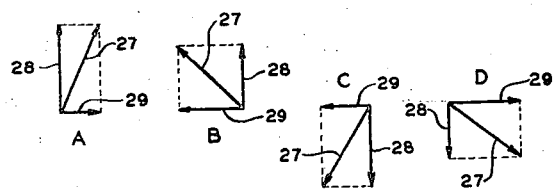
Figure 3:
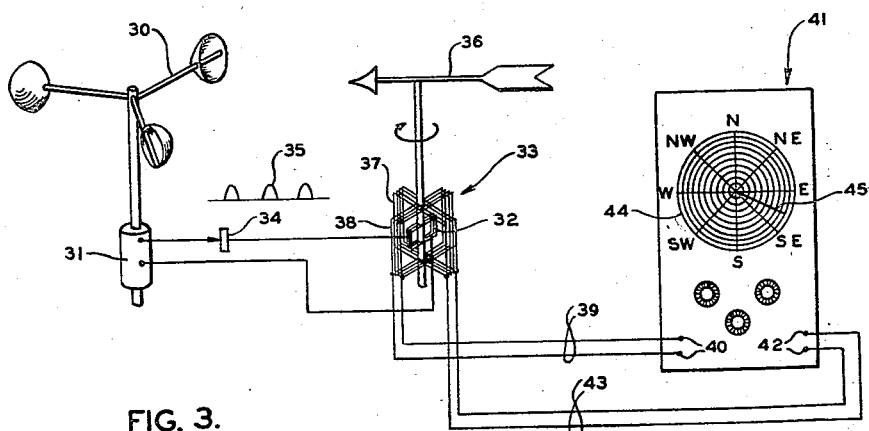

In the accompanying drawing:

Figure 1 is a schematic diagram illustrating a telemetric system in accordance with the present invention for transmitting and indicating the orientation of a wind vane, Figures 2A, B, C, and D show four examples of the effect of diverse magnitudes and polarity of voltages applied to opposing deflection plates of a cathode ray oscilloscope on the electron beam trace, And Figure 3 is a schematic circuit diagram showing a telemetric system in accordance with the invention for simultaneously transmitting and indicating the orientation of a wind vane and the angular speed of an anemometer.

Referring now to the drawing and more particularly to Figure 1, a preferred embodiment of the invention is disclosed wherein the angular orientation of a wind vane 10 is transmitted to a visual indicator 11 remotely disposed therefrom. The wind vane 10 is mechanically coupled by means of a shaft 12 to the rectangular rotor loop 13 of a goniometer 14. The goniometer 14 comprises in addition to the rotor loop 13, a pair of mutually perpendicular rectangular stator loops 15 and 16 concentrically disposed about the rotor. The shaft 12 is maintained in bearings mounted at the points of intersection between stator loops 15 and 16. The terminals of rotor 13 are connected to slip rings 17 and by means of brushes are connected to an alternating current generator 18 through a half-wave rectifier 19, preferably of the copper oxide type. The voltage output wave of generator 18 is sinusoidal as shown by wave form 20, and after rectification it assumes the form of half-wave pulses as shown by form 21.

As the orientation of the wind vane 10 is shifted by wind movement, the position of rotor 13 in respect to stators 15 and 16 is correspondingly altered. As is well known, maximum inductive coupling between rotor 13 and either stator 15 or 16 will occur when the rotor and a stator lie in the same plane. Inasmuch as stator loops 15 and 16 are mutually perpendicular, when the energy induced in one stator is at maximum, the energy in the other falls to zero. Where the rotor 13 lies in a plane common to neither stator 15 nor 16, the relative magnitude of energies induced in the stators depends upon their respective degree of deviation from the rotor plane. It will also be evident that the polarity of energy induced in the stator loops 15 and 16 will reverse at 180° points in the angular movement of the rotor loop 13.

The terminals of stator loop 15 are connected by means of an extended two wire line 22 to the input terminals of the vertical amplifier 23 of oscillograph 11 whereas the terminals of stator 16 are connected to the input terminals of the horizontal amplifier 24 through an extended two wire line 25. The output of amplifier 23 is connected to the vertical deflection plates of a cathode ray tube 26 while the output of amplifier 24 is connected to the horizontal deflection plates thereof. Amplifiers 23 and 24 are both adjusted to provide an equal measure of amplification. Initially, the cathode ray beam is focussed and positioned as to impinge on the central point of the screen. The voltage output of amplifiers 23 and 24 are in phase but vary in magnitude and in polarity in accordance with the voltages induced in loops 15 and 16. Thus the voltages applied to the deflection plates of cathode ray tube 26 displace the electron beam in a direction and to an extent which is the vector sum of the applied voltages.

The effect of applying voltages of diverse magnitude and polarity to opposing deflection plates of cathode ray tube 26 may be more clearly understood by referring to Figures 2A to D of the drawing depicting in four examples the vector resultant 27 as displayed on the screen when a voltage 28 is applied to the vertical deflection plates and a voltage 29 to the horizontal deflection plates. It will be seen that the quadrant wherein the vector falls is contingent upon the polarities of the applied voltages whereas the angular position of the vector 27 within the quadrant depends upon the relative magnitudes of the applied voltages. It is to be noted that the length of the vector has no significance in reading wind direction. In practice a transparent screen having azimuthal markings inscribed thereon may be imposed over the screen of the cathode ray tube 26 thereby permitting direct reading.

In the telemetric system for a wind vane disclosed in Figure 1 it is necessary to provide motive power to operate the alternating current generator 18. In the preferred embodiment of the present invention depicted in Figure 3, telemetric means are provided for transmitting the responses of a wind vane and a rotation anemometer to a visual indicator remotely disposed therefrom. In this arrangement, the anemometer in addition to measuring the wind speed motivates an alternating current generator which provides pulses for the wind vane goniometer. The rotation anemometer 30 is shown to be of the three cup type although any other suitable rotation anemometer such as the propeller or windmill type may be effectively employed in lieu thereof. The anemometer 30 is mechanically coupled to a shaft extending from the armature of an alternating current generator 31 of the type characterized by an output voltage and frequency substantially proportional to the angular speed of the armature. The output of generator 31 is impressed upon the rotor loop 32 of a goniometer 33 through a half-wave rectifier 34. Thus, the energy applied to the rotor 32 assumes the shape of half-wave pulses, as shown by form 35 whose amplitude and frequency are a function of wind speed. Reversing the direction of rotation taken by anemometer 30 will displace the phase of the output of generator 31 by 180°, but this effect in no way influences the operation of the system.

Mechanically coupled to the rotor loop 32 is a wind vane 36 which determines the orientation of the rotor 32 in respect to the stators 37 and 38. As hereinabove explained in connection with Figure 1 the ratio of voltages between stator 37 and 38, as well as their polarities, depends upon the orientation of the rotor 32 as determined by the wind vane 36. However, since the voltage applied to the rotor 32 is a function of wind speed, the magnitude of the stator output voltages will correspondingly vary although the ratio therebetween will remain undisturbed.

The output of stator loop 38 is fed through a two wire line 39 to the horizontal deflection terminals 40 of a cathode ray oscillograph 41 while the output of loop 37 is applied to the vertical deflection terminals 42 through a two wire line 43. A transparent screen 44 is superimposed over the screen of a cathode ray tube which is inscribed with radial lines marked in terms of azimuth and equally spaced concentric lines calibrated in terms of wind speed. When the trace 45 appears on the screen of the oscilloscope, the angular position of the trace gives the wind direction and the magnitude of the trace furnishes the wind speed.

The number of transmission lines connecting the goniometer 33 with oscillograph 41 may be reduced by making one wire of line 39 common with one of line 43.

While there has been described what is at present considered preferred embodiments of the invention, it will be obvious to those skilled in the art that various changes and modifications may be made therein without departing from the invention, and it is, therefore, aimed in the appended claims, to cover all such changes and modifications as fall within the true spirit and scope of the invention.

I claim:

1. In a telemetric system for indicating the angular position of a movable object, the combination comprising a goniometer having a rotor loop and a pair of mutually perpendicular stator loops concentric therewith, means for orienting the said rotor loop in accordance with the angular position of the object, a source of unipolarity pulses connected to said rotor loop, and means for comparing the relative magnitudes and polarity of the pulse energy induced in said stator loops.

2. In a telemetric system for indicating the angular position of an object, the combination comprising a goniometer having a rotor loop and a pair of mutually perpendicular stator loops concentric therewith, means for varying the position of said rotor loop in accordance with the angular position of the object, a source of unipolarity energy pulses connected to said rotor loop, and a cathode ray indicator having its vertical deflection means in association with one of said stator loops and its horizontal deflection means in association with the other said stator loops whereby the angular position of the line trace produced on the screen thereof corresponds with the position of said rotor loop in respect to said stators.

3. In a telemetric system for indicating the angular position of a wind vane, the combination comprising a goniometer having a rotor loop and a pair of mutually perpendicular stator loops concentric therewith, means for orienting said rotor loop in accordance with the angular position of the wind vane, an alternating current generator associated with said rotor loop, a half-wave rectifier interposed between said generator and said rotor loop, a cathode ray indicator having its vertical deflection means in association with one of said stator loops and its horizontal deflection means in association with the other of said stator loops whereby the angular position of the line trace produced on the screen thereof corresponds with the position of said rotor loop in respect to said stator loops.

4. In a telemetric system for simultaneously indicating the angular position of a wind vane and the angular speed of a rotation anemometer, the combination comprising a goniometer having a rotor loop and a pair of mutually perpendicular stator loops concentric therewith, means for orienting the position of said rotor loop in accordance with the angular position of the wind vane, an alternating current generator connected to said rotor loop, means for mechanically motivating said generator at a speed in accordance with the anemometer, a half-wave rectifier interposed between said generator and said rotor loop, and a cathode ray indicator having its vertical deflection means in association with one of said stator loops and its horizontal deflection means in association with the other of said stator loops whereby the angular position of the trace produced on the screen thereof corresponds with the position of the wind vane and the length of said trace is proportional to the speed of the anemometer.

LEON HILLMAN.